United States Patent [19]

Wagensonner

[11] Patent Number: 5,003,381

[45] Date of Patent: Mar. 26, 1991

[54] METHOD AND APPARATUS FOR POINT-BY-POINT REPRODUCTION OF AN ORIGINAL

[75] Inventor: Eduard Wagensonner, Aschheim, Fed. Rep. of Germany

[73] Assignee: AGFA Gevaert Aktiengesellschaft, Leverkusen, Fed. Rep. of Germany

[21] Appl. No.: 797,246

[22] Filed: Nov. 12, 1985

[30] Foreign Application Priority Data

Nov. 24, 1984 [DE] Fed. Rep. of Germany ....... 3442955

[51] Int. Cl.⁵ ............................................. H04N 1/46
[52] U.S. Cl. ...................................... 358/75; 358/298; 355/202
[58] Field of Search ................... 358/75, 80, 302, 296, 358/298; 355/5, 88

[56] References Cited

U.S. PATENT DOCUMENTS

| | | | |
|---|---|---|---|
| 1,717,781 | 6/1929 | Ives | 358/302 |
| 2,757,571 | 8/1956 | Loughren | 358/80 |
| 2,972,012 | 2/1961 | Farber | 358/80 |
| 3,536,403 | 6/1968 | Strickholm | 358/298 |
| 3,564,131 | 2/1971 | Herold et al. | 358/302 |
| 3,651,246 | 3/1972 | Bergero | 358/75 |
| 3,671,666 | 6/1972 | Hennig | 358/75 |
| 3,842,195 | 10/1974 | Takahashi et al. | 358/75 |
| 4,025,189 | 5/1977 | Pugsley | 358/298 |
| 4,032,969 | 6/1977 | Ueda | 358/80 |
| 4,081,828 | 3/1978 | Jones et al. | 358/75 |
| 4,198,154 | 4/1980 | Masegi et al. | 355/5 |
| 4,285,580 | 8/1981 | Murr | 358/80 |
| 4,308,326 | 12/1981 | Wirth | 358/298 |
| 4,395,108 | 7/1983 | Morse | 358/75 |
| 4,402,015 | 8/1983 | Yamada | 358/80 |
| 4,551,751 | 11/1985 | Jung | 358/75 |

OTHER PUBLICATIONS

Biedermann, Klaus, "Ermittlung des Zusammenhanges zwischen der subjektiven Güte und den physikalischen Eigenschaften des photographischen Bildes", *Photographische Korrespondenz*, vol. 103, Nos. 1–3, 1967, pp. 5–14, 26–31, 42–48.

Gove, Philip Babcock, Editor in Chief, *Webster's Third New International Dictionary of the English Language Unabridged*, G. & C. Merriam Company, date unknown, p. 1023, see entry for "Halogenide".

*Primary Examiner*—James J. Groody
*Attorney, Agent, or Firm*—Peter K. Kontler

[57] ABSTRACT

The transparencies of an original for the primary colors are measured at a series of discrete points. The transparency values are processed to adjust for the characteristics of the copy material and the characteristics of the light source used to form an image of the original on the copy material. The light source is a cathode ray tube which generates an image forming beam having a Gaussian intensity distribution with a maximum at the longitudinal axis of the beam. The copy material is a hard copy material having three layers each of which is sensitized to light of a different primary color. Each layer responds to light of the corresponding color having an intensity in excess of a corresponding threshold level but exhibits no response to light having an intensity below this level. An image of the original is formed on the copy material point-by-point using the image forming beam from the cathode ray tube. The size of each image point depends upon the intensity of the beam relative to the threshold levels. By regulating the intensity of the beam on the basis of the adjusted transparency values of the original, the sizes of the image points are such that the tones of the image correspond to those of the original.

21 Claims, 4 Drawing Sheets

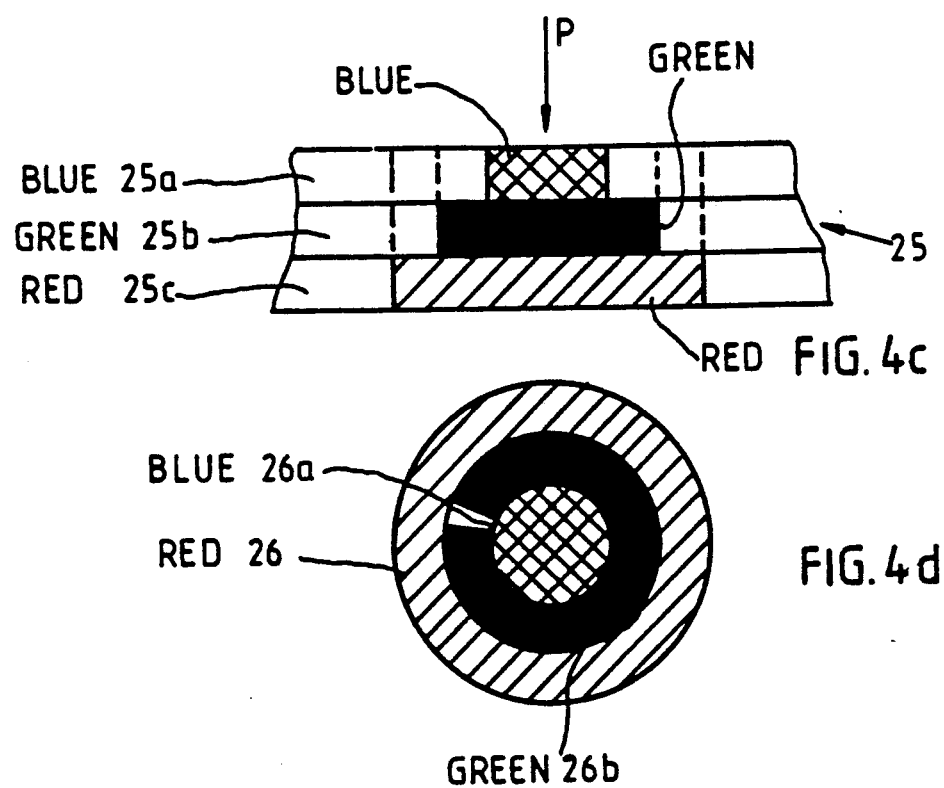

METHOD AND APPARATUS FOR POINT-BY-POINT REPRODUCTION OF AN ORIGINAL

BACKGROUND OF THE INVENTION

The invention relates generally to the copying of originals, e.g., photographic originals.

More particularly, the invention relates to a method of, as well as an arrangement and a copy material for, reproducing an original point-by-point.

It is known to form a photographic image of an original on light-sensitive material point-by-point using a light beam. The transparency of the original is measured at different points, and the transparency values are used to control the intensity of the beam. The transparency values may be temporarily stored after measurement of the original and retrieved from storage when the original is to be reproduced.

Several variations of the copying procedure outlined above have been proposed. This procedure is of interest because point-by-point exposure of the copy material makes it possible to change the density range of an original in dependence upon the sensitivity of the copy material. As a rule, the density range of an original is reduced in order to conform to the sensitivity of the copy material. Furthermore, the preceding copying procedure enables so-called image improvement such as, for example, an increase in the definition of edges, to be achieved.

In spite of its benefits, the above copying procedure has not been accepted commercially because the improvement in subjective image quality is not sufficient to warrant the additional cost. Based on earlier research, subjective image quality is represented essentially by the sharpness of the image which, in turn, is best represented by the modulation transfer function. See, for instance, the article "Ermittlung des Zusammenhanges zwischen der subjektiven Güte und den physikalischen Eigenschaften des photographischen Bildes", Biedermann, Klaus; Photographische Korrespondenz, Vol. 103, pp. 5–14, 26–31 and 42–48. However, the modulation transfer function of an image produced electronically point-by-point using a cathode ray tube, for example, as an imaging element does not, as long as the number of points is small enough for economical operation, yield an image significantly better than one of similar resolution produced via a conventional integral exposure. The reason is that the beam from a cathode ray tube has an approximately Gaussian intensity distribution so that such a beam is unable to precisely reproduce an infinitely sharp black-to-white transition in an original.

OBJECTS AND SUMMARY OF THE INVENTION

The invention is based on the recognition that an outstanding subjective image sharpness is often achieved during screen printing with relatively low resolution as measured in number of image points per millimeter, and it is an object of the invention to photographically produce an image quality comparable to that obtained by screen printing.

Another object of the invention is to provide a copying method which enables an image of improved subjective quality to be obtained during point-by-point photographic reproduction of an original.

An additional object of the invention is to provide a copying arrangement which makes it possible to produce an image of improved subjective quality when an original is photographically reproduced point-by-point.

A further object of the invention is to provide a copy material which is capable of yielding an image of improved subjective quality during point-by-point photographic reproduction of an original.

The preceding objects, as well as others which will become apparent as the description proceeds, are achieved by the invention.

One aspect of the invention resides in a copying method which comprises the following steps:

A. Measuring the transparencies of discrete points of an original to be copied.

B. Forming an image of the original on hard copy material, i.e., copy material which responds to radiation having an intensity in excess of a threshold level but is substantially non-responsive to radiation having an intensity below the threshold level. The forming step is performed point-by-point using a radiation beam, preferably a light beam, having an intensity which decreases in a direction from the center to the edge of the beam. The forming step includes regulating the intensity of the beam on the basis of the measured transparencies such that the tones of the image substantially correspond to those of the original.

The transparency values of the original may be temporarily stored prior to the forming step.

The combination of a hard copy material with an image forming beam having an intensity which decreases in a direction from the center to the edge of the beam results in an image containing essentially two density gradations, namely, regions of maximum density and unblackened regions. Thus, radiation having an intensity below the threshold level for the copy material produces no darkening. The size of any image point depends upon the intensity of the radiation used to generate the point relative to the threshold intensity level for the copy material. By electronically controlling the intensity of the image forming beam, and hence the sizes of the image points, it is possible to photographically produce a pattern of points which together constitute an image having the correct tones.

According to the invention, point color images having an outstanding subjective image sharpness may be formed by employing copy material containing three hard layers each of which is sensitized to a different primary color.

Another aspect of the invention resides in a copying arrangement which comprises the following:

A. Measuring means for measuring the transparencies of discrete points of a colored original in each of the primary colors.

B. Image forming means for forming an image of the original on copy material containing three layers each of which is sensitized to a different primary color, and each of which is responsive to radiation in the respective primary color having an intensity in excess of a threshold level but is substantially non-responsive to radiation in the respective primary color having an intensity below the corresponding threshold level. The image forming means includes generating means for generating a beam of radiation having an intensity in each primary color which decreases in a direction from the center to the edge of the beam.

C. A plurality of filters movable into and out of the path of the beam and each designed to filter a different pair of primary colors from the latter.

D. Control means for controlling the image forming means in such a manner that an image of the original is produced point-by-point.

In one embodiment of the arrangement, the control means is designed to effect exposure of a first part of each of different points of the copy material to radiation in one primary color, and to also effect exposure of at least the first part of each point to radiation in at least one other primary color. Preferably, radiation in a first primary color is applied to a circular first part of each point while radiation in a second primary color is applied to the first part as well as an annular second part which is concentric with the respective first part. The control means is further designed to regulate the intensity of the beam in each primary color on the basis of the measured transparencies of the original in the respective color, the intensity distribution of the respective color in the beam, the gamma value of the respective layer of the copy material, and the mutual influences of the primary colors in the first parts of the points upon one another.

In another embodiment of the arrangement, the control means is arranged to effect exposure of a first part of each of different points of the copy material to radiation in one primary color, and to effect exposure of a discrete second part of each point to radiation in another primary color. The spacing between the first and second parts of each point is less than the distance between neighboring points, and the control means functions to shift the beam by such spacing relative to the first part of a point subsequent to irradiation of the first part and prior to irradiation of the second part. The control means also serves to regulate the intensity of the beam in each primary color on the basis of the measured transparencies of the original in the respective color.

The generating means may include a potential source for shifting the beam. The control means in the latter embodiment of the arrangement may then be designed to change, e.g., to increase, the voltage of the source by such an amount subsequent to irradiation of the first part of a point and prior to irradiation of the second part that the beam is shifted relative to the first part through a distance substantially equalling the spacing between the first and second parts.

The control means in the second embodiment of the arrangement may further function to effect exposure of a discrete third part of each point to radiation in an additional primary color. Here, it is preferred for the control means to shift the beam in such a manner that the respective parts of each point are either disposed on a line or at the apices of an equilateral triangle.

An additional aspect of the invention resides in a copy material which comprises the following:

A. A first layer sensitized to radiation in a first primary color.

B. A second layer sensitized to radiation in a second primary color.

C. A third layer sensitized to radiation in a third primary color. Each of the layers has a gamma value in excess of about 2.5 and includes a silver halogenide emulsion.

The novel features which are considered as characteristic of the invention are set forth in particular in the appended claims. The improved copying method, copying arrangement and copy material, however, will be best understood from a perusal of the following detailed description of certain specific embodiments when read in conjunction with the accompanying drawings.

BRIEF DESCRIPTION OF THE DRAWINGS

FIG. 4c is similar to FIG. 4a but assumes that each of the layers is exposed to radiation in the respective color having an intensity in excess of a threshold level;

FIG. 4d illustrates a colored image point formed in accordance with FIG. 4c and again having a central part produced by irradiation with more than one primary color;

DESCRIPTION OF THE PREFERRED EMBODIMENTS

Figure 1:
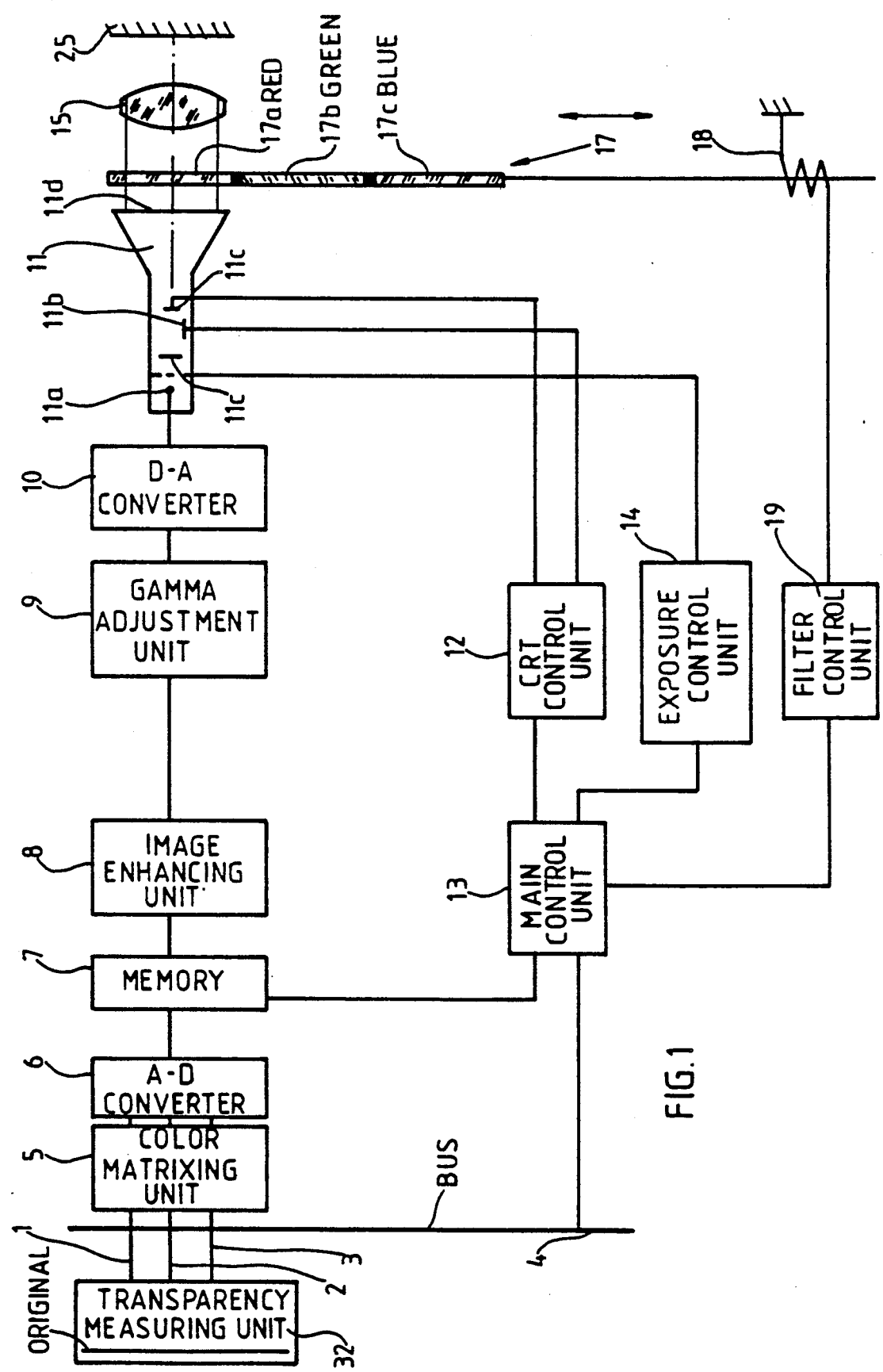
FIG. 1 is a block diagram showing certain basic components of a copier for point-by-point photographic reproduction of colored originals using a cathode ray tube.

FIG. 1 is a block diagram showing certain basic components of a copier which may be used for point-by-point reproduction of a colored, non-illustrated original. The copier has a scanning unit and an exposure unit, and the mechanical structure of these units may, for example, include a pair of conventional, non-illustrated tensioning devices which are arranged next to one another and respectively serve to tension an original and a sheet or strip of copy material.

In FIG. 1, the sequence of operations proceeds from left to right. The scanning unit of the copier is represented by a transparency measuring unit 32 which measures the transparencies of an original in each of the primary colors. The transparency measuring unit 32 comprises a device, e.g., a cathode ray tube, for generating a scanning beam, and a plurality of filters each of which permits the passage of radiation in a different primary color. The filters are consecutively moved into the path of the scanning beam, and each filter remains in such path while the scanning beam is swept across the original once. During each sweep, the transparency of the original in one of the primary colors is measured at a series of discrete points of the original. To this end, the transparency measuring unit 32 further comprises a plurality of photoreceivers each of which is sensitized to one of the primary colors. The photoreceivers are arranged on the side of the original remote from the beam generating device and measure the intensity of the radiation which has passed through the original.

The photoreceivers emit intensity signals which are delivered to a color matrixing unit 5 via respective conductors 1, 2 and 3. The signals generated by the photoreceivers may, if desired, be converted into density signals representing the densities of the original in the primary colors. The matrixing unit 5 is further connected with a conductor or bus 4 for the transmission of a synchronizing signal which is issued during scanning of an original.

The intensity signals representing the transparencies or densities of the various points of the original in each of the primary colors pass through the respective conductors 1,2,3 in succession. After undergoing processing in the color matrixing unit 5 and an analog-digital converter 6, the intensity signals for each point in the three primary colors are stored in a memory 7.

The memory 7 is connected with a unit 8 for enhancing the image of the original, e.g., for increasing the definition of the edges. The image enhancing unit 8 may, for instance, be designed in accordance with the teachings of the published International Application No. PCT GB 79/00159. The memory 7 is further connected with a central processing unit or main control unit 13. The latter is connected with and receives synchronizing signals from the conductor 4.

Downstream of the image enhancing unit 8 is a gamma adjustment unit 9 which, in turn, is connected with a digital-analog converter 10. The latter is connected with the cathode 11a of a cathode ray tube 11 which serves as a means for forming an image of the original on light-sensitive or color copy material 25 point-by-point. The gamma adjustment unit 9 functions to adjust the intensity signals derived from the original to the characteristic blackening line or lines of the copy material 25 taking into account the characteristic line of the cathode ray tube 11 and the desired size of the image points. The adjusted intensity signals are transmitted to the digital-analog converter 10 which generates a corresponding output voltage. This output voltage directly influences the intensity of the beam emitted by the cathode 11a of the cathode ray tube 11.

The cathode ray tube 11 contains a first pair of electrodes 11b and a second pair of electrodes 11c for effecting vertical and horizontal deflection of the cathode beam. The voltages for controlling deflection of the beam are supplied to the electrodes 11b,11c by a CRT control unit 12 which is connected with the main control unit 13. The end of the cathode ray tube 11 remote from the cathode 11a is provided with a screen 11d.

In principle, the dynamics of the gamma adjustment unit 9 and digital-analog converter 10 which regulate the intensity of the cathode beam suffice to control the amounts of copy light in each primary color for copy material having a contrast of 1:100. Nevertheless, an exposure control unit 14 is provided to permit control of the exposure time. The exposure control unit 14 is connected with the cathode ray tube 11 and the main control unit 13. The main control unit 13 is thus able to vary the exposure time through the number of complete images reproduced per primary color.

The screen 11d of the cathode ray tube 11 is sharply focused on the copy material 25 by an objective 15. Between the screen 11d and the objective 15 is a guide for a sliding filter unit 17 containing a red filter 17a, a green filter 17b and a blue filter 17c. The sliding filter unit 17 is movable in the directions indicated by the double-headed arrow s that any one of the filters 17a,17b,17c may be shifted into the path of the beam from the cathode ray tube 11. Movement of the sliding filter unit 17 is controlled by a magnetic or other suitable drive 18. The drive 18 is regulated by a filter control unit 19 which, in turn, is connected with the main control unit 13.

Assuming, for example, that the red filter 17a is initially in front of the cathode ray tube 11, the main control unit 13 causes the image forming beam from the tube 11 to sweep the copy material 25 one or more times based on the red intensities of the scanned points of the original. As the beam sweeps the copy material 25, a red image of each scanned point of the original having a red component is formed at a respective point of the copy material 25. Once the red images have been formed, the main control unit 13 signals the filter control unit 19 to move the green filter 17b into the path of the image forming beam. The main control unit 13 now causes the beam to sweep the copy material 25 one or more times based on the green intensities of the scanned points of the original. A green image of each scanned point of the original having a green component is then formed at a corresponding point of the copy material 25. When the green images have been formed, the blue filter 17c is moved into the path of the image forming beam in order that a blue image of each scanned point of the original having a blue component may be formed at a respective point of the copy material 25. This completes reproduction of the scanned points of the original as image points on the copy material 25, that is, point-by-point reproduction of the original. Preparatory to reproduction of a fresh original, the filter control unit 19 activates the drive 18 so as to again move the red filter 17a into the path of the image forming beam.

Figure 2A:
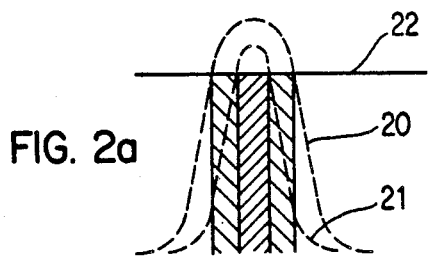
FIG. 2a illustrates how the intensity distribution in an image forming radiation beam changes with the transparency of an original being copied.
Figure 2B:
FIG. 2b shows the sizes of the image points corresponding to the respective intensity distributions of FIG. 2a when using a hard copy material which responds only to radiation having an intensity in excess of a threshold level.

FIGS. 2a and 2b illustrate how the size of an image point may be varied by changing the intensity of an image forming beam. For ease of explanation, it is assumed that the point being reproduced has a single color, e.g., black. However, the following discussion is equally applicable to any one of the primary colors of a colored point.

In accordance with the invention, the image forming beam, such as that from the cathode ray tube 11, used for point-by-point reproduction of an original has an intensity in each primary color which decreases in a direction from the center to the edge of the beam. This is shown in FIG. 2a where the curve 20 represents the intensity distribution of an image forming beam in a plane which intersects the beam perpendicular to the longitudinal axis of the latter. In FIG. 1, this is the intensity distribution in the point formed by the cathode beam on the screen 11d. The image forming beam is essentially rotationally symmetrical, and the intensity decreases substantially uniformly to all sides from a maximum at the central longitudinal axis of the beam. The intensity distribution of the beam is essentially Gaussian. The curve 20 of FIG. 2a may, for instance, represent the intensity distribution of the image forming beam for an image point of medium brightness. A second curve 21 shown in FIG. 2a represents the intensity distribution of the beam for an image point of distinctly lower brightness. The curve 21 is substantially parallel to the curve 20, that is, the distance between the maxima of the curves 20 and 21 is approximately the same as the distance between the sloping sides of the curves.

Further in accordance with the invention, the copy material used for point-by-point reproduction of an original is a hard copy material, i.e., a copy material which is unresponsive to radiation having an intensity below a threshold level but responds to radiation having an intensity in excess of this level. In FIG. 2a, the intensity threshold level is indicated at 22 and is shown as a horizontal line for ease of explanation. A copy material having the intensity threshold level 22 undergoes an abrupt change in blackening when the intensity of the radiation reaches the level 22. After exposure to radiation having an intensity below the threshold level 22, the copy material exhibits no blackening upon development. On the other hand, if the copy material is exposed to radiation having an intensity above the threshold level 22, the copy material exhibits maximum blackening when it is developed. Copy materials having a behavior which approaches this idealized behavior exist. A particular example is the so-called lithographic material which is used in the black-and-white printing industry and has a gamma value greater than 8. An abrupt change in the blackening curve can also be obtained with other emulsion-carrying materials as well as by the use of suitable imaging or reproduction processes such as, for instance, electrophotographic processes, silver salt diffusion processes, thermography and dye injection.

The hard copy material employed by the invention preferably has a gamma value in excess of 2.5 and is advantageously developed to maximum density after exposure. The copy material may be an electrostatic or magnetic copy material. Either negative or positive copy material may be used.

FIG. 2b shows the size or diameter of an image point produced for a given intensity distribution curve, a predetermined exposure time and a particular intensity threshold level. The circle 20a represents the image point obtained from a beam having an intensity distribution corresponding to the curve 20 of FIG. 2a while the circle 21a represents the image point obtained from a beam having an intensity distribution corresponding to the curve 21. It will be observed that the area of an image point, which is determinative of subjective image blackening, does not vary linearly with beam diameter at the intensity threshold level 22 but, rather, varies approximately as the square of the beam diameter at the threshold level 22.

Figure 3A:
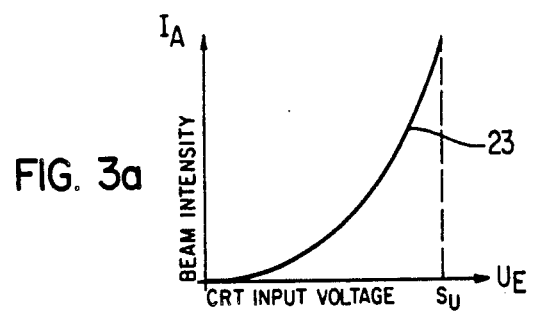
FIG. 3a illustrates a characteristic curve for a cathode ray tube.
Figure 3B:
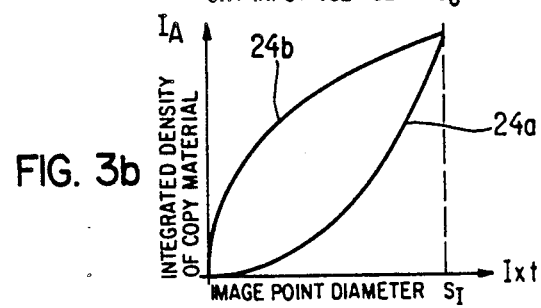
FIG. 3b shows a pair of curves which correspond to the characteristic curve of FIG. 3a and represent the respective characteristic responses of negative and positive copy material to radiation.
Figure 3C:
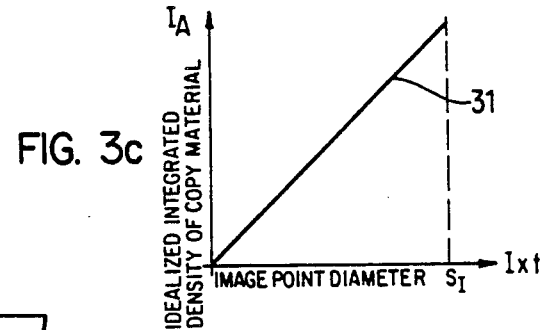
FIG. 3c illustrates an idealized characteristic reproduction line derived by applying a transfer function to one of the curves of FIG. 3b.

FIGS. 3a–3c illustrate the relationship between the characteristics of the device which generates the image forming beam and the blackening of the copy.

In FIG. 3a, the input voltage, $U_E$, to a cathode ray tube is plotted on the abscissa and the beam intensity, $I_A$, is plotted on the ordinate. The curve 23 is a so-called characteristic tube curve. The characteristic curve for a cathode ray tube represents either the maximum or average intensity at the longitudinal axis of the cathode beam as a function of the input voltage to the cathode. For any cathode ray tube, the characteristic curve is obtained from the manufacturer. It will be observed that the input voltage, $U_E$, to the cathode ray tube of FIG. 3a has a saturation value $S_U$.

In FIG. 3b, the amount of copy light, which equals the intensity, I, of the copy light multiplied by the exposure time, t, is plotted along the abscissa. The amount of copy light may be considered to represent the image point size in terms of image point diameter. The ordinate in FIG. 3b, which is again used to plot the intensity, $I_A$, of the cathode beam, may be considered to represent the integrated density of the copy material. The curve 24a shows how the integrated density or blackening of a negative copy material varies as a function of image point size in terms of image point diameter, and hence as a function of the input voltage to the cathode ray tube. The curve 24a may accordingly be considered a characteristic blackening curve for the negative copy material. Since the blackened portion of the copy material varies with the square of image point diameter, the integrated density initially increases very slowly but then rises sharply as it approaches the saturation value $S_I$.

The curve 24b in FIG. 3b shows the integrated density or blackening of a positive copy material, i.e., a reverse copy material. Such a copy material is black in unexposed regions and light in the exposed regions constituted by the image points. Hence, the curve 24b initially rises very steeply and then rises more gradually as it approaches the saturation value $S_I$.

The gamma adjustment unit 9 of FIG. 1 implements an appropriate transfer function to derive an idealized characteristic reproduction curve based on the characteristic tube curve 23 of FIG. 3a and the characteristic blackening curve of the copy material as in FIG. 3b. The characteristic blackening curve of the copy material depends upon whether a negative or positive copy material is used, and the curve 24a of FIG. 3b is employed for a negative copy material whereas the curve 24b is utilized for a positive copy material.

FIG. 3c illustrates an idealized characteristic reproduction curve 31 on a coordinate system similar to that of FIG. 3b. The characteristic reproduction curve 31, which is only exemplary, is here shown to be linear. A linear idealized characteristic reproduction curve may be derived from the characteristic blackening curve 24b of FIG. 3b at lesser expense than from the characteristic blackening curve 24a.

The copier of FIG. 1 is designed for the reproduction of colored originals. However, the copier may be simplified and used directly for the reproduction of black-and-white originals. If the copier is to be employed for the reproduction of black-and-white originals, the conductors 1–3 may be replaced by a single conductor for the intensity signals, and the sliding filter unit 17 together with its drive 18 and filter control unit 19 may be eliminated.

A material suitable for the enlargement of black-and-white originals is the lithographic film employed in the graphic industry and having a gamma value in excess of 8. This film approximates the behavior shown in FIG. 2a where a copy material has an intensity threshold level below which no blackening and above which maximum blackening occur. From a practical standpoint, such lithographic film thus exhibits only two gradations of blackening. This property may be enhanced by developing the film to maximum density, that is, by selecting the developing time so that all areas of the film which were exposed to radiation having an intensity in excess of the threshold level are developed to maximum density. Due to the blackening characteristics of the lithographic film, the development to maximum density may, within relatively wide limits, be carried out independently of temperature and developing time without blackening of those areas of the film which were exposed to radiation having an intensity below the threshold level. The chemical treatment of such film after exposure may accordingly be controlled with little expense.

Assuming that the copier of FIG. 1 is to be used for reproduction of a black-and-white original and has been simplified as outlined above, the transparency of the original is measured at a series of discrete points. The resulting intensity signals are delivered to the analog-digital converter 6 via the single conductor which replaces the conductors 1-3, e.g., via the conductor 2, and undergo analog-to-digital conversion. The intensity signals are thereupon entered in the memory 7 where the density range of the original is determined, e.g., by a maximum-minimum analysis. A determination is made as to which density values of the original are to be assigned to the maximum image point size and which density values are to be assigned to the minimum image point size. The density values in between are adjusted point-by-point in the gamma adjustment unit 9 based on the characteristic tube curve 23 of FIG. 3a and the characteristic curve 24a or 24b of FIG. 3b for the integrated density or individual blackening. The adjustment is performed in such a manner that the sizes of the image points on the copy material yield an image having color tones which substantially correspond to those of the original. Since, from a practical standpoint, the copy material exhibits only two density gradations, that is, only blackened and unblackened regions, the image points have extremely sharp edges which produce a spectrum having high localized frequencies. The human eye registers these high localized frequencies as increased sharpness even if the pattern of image points is not particularly fine in terms of number of points per millimeter. As a rule, five or six image points per millimeter is already sufficient to give the impression of a highly resolved, very sharp image.

The conventional measures for image improvement may also be employed in the point-by-point reproduction of images according to the invention. Such conventional measures include additional definition of edges, adjustment of the density range of the copy to that of the original and, in the case of color copying, increasing color saturation.

The method of the invention can be used not only for the reproduction of black-and-white originals but also for the copying of colored originals. In such an event, a color copy material containing three very hard layers is employed, that is, a copy material containing three layers each of which is sensitized to a different primary color, and each of which responds to radiation in the respective primary color having an intensity in excess of a threshold level but is substantially non-responsive to radiation in the respective primary color having an intensity below the threshold level. The gamma value of each layer should be no less than about 2.5. Advantageously, each layer of the copy material includes a silver halogenide emulsion.

For point-by-point reproduction of color information, certain requirements beyond those for the reproduction of black-and-white originals must be fulfilled. These additional requirements will be described with reference to FIGS. 4–7 in conjunction with FIG. 1.

Figure 4A:
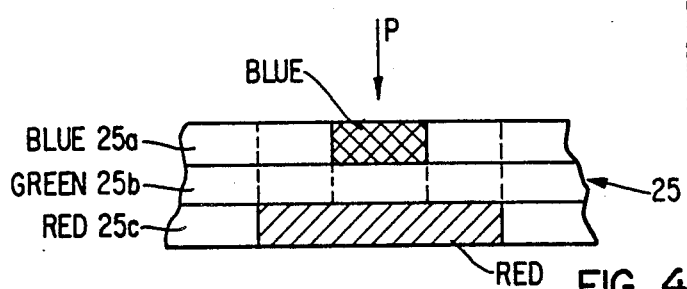
FIG. 4a shows one mode of formation of an image point on copy material containing three layers is sensitized to a different primary colors with the assumption that only two of the layers are exposed to radiation in the respective color having an intensity in excess of a threshold level.

FIG. 4a shows the copy material of FIG. 1 to have a first emulsion-bearing layer 25a which is sensitized to blue radiation, a second emulsion-bearing layer 25b which is sensitized to green radiation, and a third emulsion-bearing layer 25c which is sensitized to red radiation. FIG. 4a illustrates irradiation of the copy material 25 in the direction indicated by the arrow P, and the copy material is successively exposed to radiation in the respective primary colors by successively moving the color filters 17a,17b,17c into the path of the image forming beam generated by the cathode ray tube 11. Each image point is made up of a set of concentric circles which are produced by irradiating the copy material 25 with respective beams of radiation each having a color corresponding to one of the color components of the image point. In this regard, the showing of FIGS. 2a and 2b applies to each individual layer 25a-25c and the respective beam of colored radiation to which it is sensitized. The intensity of the image forming beam generated by the cathode ray tube 11 determines the intensity distribution curve 20,21 of each colored beam travelling through a filter 17a-17c and thereby determines the diameter of the corresponding color component of each image point for a given intensity threshold level 22 of the respective layer 25a-25c of the copy material 25. In the illustrative example of FIG. 4a where the formation of a single image point is shown, the diameter of the blue component formed in the blue-sensitive layer 25a is distinctly smaller than the diameter of the red component formed in the red-sensitive layer 25c. It is assumed that the beam of green radiation in FIG. 4a has an intensity below the intensity threshold level of the green-sensitive layer 25b so that no green component is formed on the copy material 25.

Figure 4B:
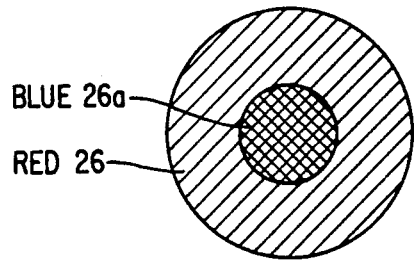
FIG. 4b illustrates a colored image point formed in accordance with FIG. 4a and having a central part produced by irradiation with more than one primary color.

FIG. 4b is a plan view of the image point shown in FIG. 4a, and the reference numeral 26a identifies the circle which circumscribes the blue component while the reference numeral 26 identifies the circle which circumscribes the red component. In the area within the circle 26a, the blue and red color components are superimposed upon one another. On the other hand, the annulus between the inner circle 26a and the outer circle 26 is entirely red. Since the area of this annulus is much larger than the area of the circle 26a, the image point defined by the blue component and red component appears predominantly red to an observer.

FIG. 4c is similar to FIG. 4a but, contrary to the latter, assumes that the beam of green radiation has an intensity in excess of the intensity threshold level of the green-sensitive layer 25b. In the resulting image point shown in plan in FIG. 4d, the reference numeral 26a again identifies the circle which circumscribes the blue component while the reference numeral 26 again identifies the circle which circumscribes the red component. The reference numeral 26b here additionally identifies the circle which circumscribes the green component. In the area within the circle 26a, the blue, green and red components are superimposed upon one another wherein in the annulus between the circles 26a and 26b only the green and red components are present. The annulus between the circle 26b and the outer circle 26 is entirely red.

Figure 5:
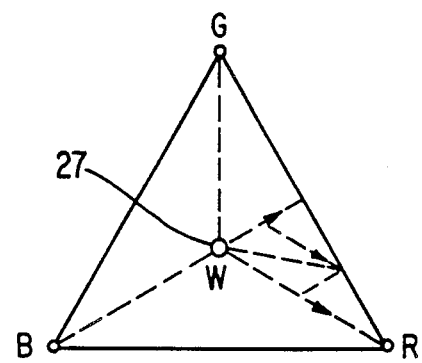
FIG. 5 is a color diagram for establishing the resultant color of the central part of the image point of FIG. 4b.

The resultant or observed color of the inner circle 26a of FIG. 4a may be determined from the color diagram of FIG. 5. This diagram is constituted by an equilateral triangle which has one of the primary colors assigned to each of its apices. In FIG. 5, the lower left apex is associated with blue as indicated by the letter B, the lower right apex with red as indicated by the letter R, and the remaining apex with green as indicated by the letter G. The center of gravity of the triangle, that is, the intersection of the bisectors of the angles, is the so-called white point W and is identified by the reference numeral 27. An image point having a color composition corresponding to that of the white point 27 may be considered to be colorless. The resultant color of any image point produced by successively exposing the same area of the color copy material 25 to radiation in different primary colors may be determined by plotting the exposure in each primary color as a vector using the white point 27 as an origin and taking into account the maximum possible saturation in the respective color. The resultant vector then indicates the resultant color of the image point. In principle, each resultant color of the color diagram can be represented by two color vectors. The third color produces only black.

The overall color effect of a colored image point formed by two concentric radiation beams of different intensity and color is due to the combined influence of an annular outer zone having a single color and a circular central zone with two super-imposed colors. The image point is thus defined by two zones of different color composition, namely, a circular first zone of superimposed exposed regions of different layers of the color copy material 25 in which the various layers 25a–25c are sensitized to different colors, and an annular second zone surrounding the first zone and consisting of an exposed region of a single layer of the copy material 25. An integrated color effect is then produced for the eye. The characteristic color mixing lines required for this purpose are generated in the color matrixing unit 5 of FIG. 1. Since the nature of the copy material 25 is such that those regions of any layer 25a–25c exposed to radiation of sufficient intensity in the respective primary color always undergo maximum blackening, calibration of the copier so as to conform to the properties of the copy material 25 is not unduly critical. The reason is that the copy material has fixed intensity threshold levels.

When the point-by-point reproduction of a colored original is performed by using concentric radiation beams of different color to generate each image point, the gamma adjustment unit 9 regulates the intensity of the image forming beam from the cathode ray tube 11 in each primary color on the basis of: (i) the measured transparencies of the original in the respective color; (ii) the intensity distribution of the respective color in the image forming beam from the cathode ray tube 11; (iii) the gamma value of the respective layer 25a–25c of the copy material 25; and (iv) the mutual influence of superimposed primary colors upon one another, or the proportions of the different primary colors, in that zone or those zones of each image point exposed to radiation in more than one color.

Figure 6:
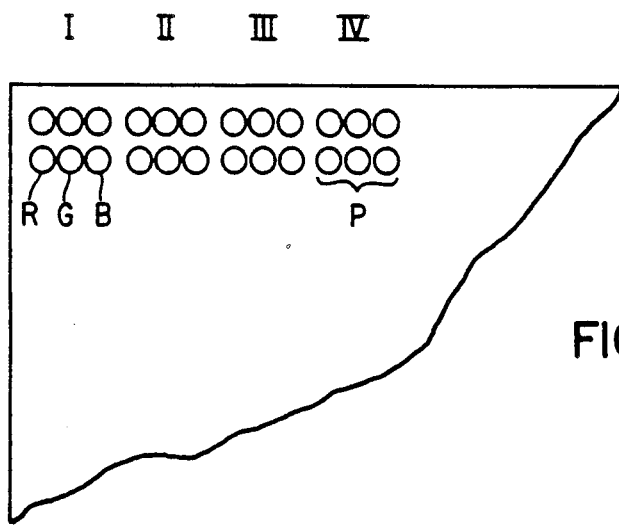
FIG. 6 shows another mode of formation of a colored image point.

A mode of color control which is simpler in principle than that described above is obtained by dividing each image point into a triplet, that is, into three adjacent colored points which do not overlap and are geometrically mixed only through the eye of an observer. Reproduction of an original in such a manner can be carried out without a significant loss in image sharpness if the pattern of image points is sufficiently fine that a plurality of consecutive image points P, e.g., three consecutive image points P, arranged in a row as shown in FIG. 6 can be considered as a single image point and the three primary color components R,G,B of each image point P are formed next to one another. Since the drive 18 for the sliding filter unit 17 is relatively slow, each color component R,G,B should be completed for all points P of an image before formation of the next color component of the image is begun.

FIG. 6 shows that the spacing between the color components R,G,B of an image point P is smaller than the distance between neighboring image points P of the same row. The spacing between the color components R,G,B should be a minor fraction of the distance between neighboring image points P of the same row.

In order to form the three color components R,G,B of each point P of an image next to one another, the position of the image forming beam from the cathode ray tube 11 must be shifted horizontally by the spacing between adjacent color components R,G,B when formation of one color component, e.g., color component R, has been completed and formation of a new color component, e.g., color component G, is to be begun. This is accomplished by changing the voltage applied to those electrodes of the cathode ray tube 11 which regulate the horizontal position of the image forming beam. When forming the color components R,G,B of an image point P, the size of each color component R,G,B should be selected in such a manner that adjacent ones of the color components R,G,B do not overlap.

Figure 7:
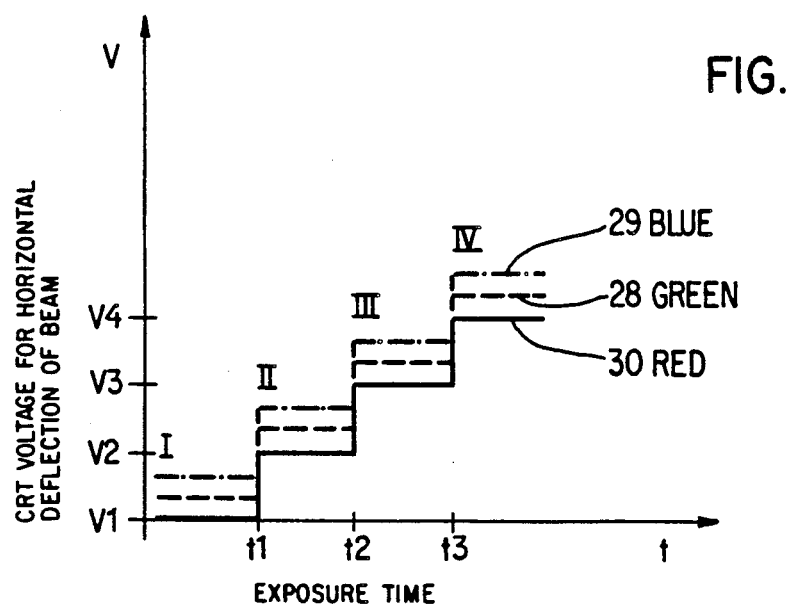
FIG. 7 is a voltage-time diagram illustrating one manner of varying the deflecting voltage of a cathode ray beam in order to produce a colored image point according to FIG. 6.

FIG. 7 is a plot of the voltage, V, for horizontal deflection of the cathode beam versus exposure time, t. In FIG. 7, the step I corresponds to the column I of FIG. 6, the step II corresponds to the column II, the step III corresponds to the column III, and the step IV corresponds to the column IV. Assuming, for example, that the red components R of the points P of an image are to be formed first, the red filter 17a of FIG. 1 is moved into the path of the image forming beam from the cathode ray tube 11. The red component R of each image point P in the upper row of FIG. 6 is then formed in accordance with the stepped curve 30 of FIG. 7. A voltage V1 is initially applied to the electrodes of the cathode ray tube 11 which regulate the horizontal position of the image forming beam. The voltage V1 is applied until time t1 when the red component R of the uppermost image point P in column I of FIG. 6 is fully formed. The voltage is now increased from V1 to V2 so that the image forming beam is deflected horizontally by a distance equal to the spacing between the uppermost image points P in columns I and II. The voltage is maintained at V2 until time t2 when the red component R of the uppermost image point P in column II is fully formed. This process is continued by increasing the voltage to V3 until time t3 and then increasing the voltage to V4, etc., until the red components R of all image points P in the uppermost row of FIG. 6 have been produced. The image forming beam may then be deflected vertically, i.e., downwards, in order to permit formation of the red components R of the image points P in the second row of FIG. 6.

Once the red component R of each point P of the image being reproduced has been formed, the green filter 17b is moved into the path of the image forming beam from the cathode ray tube 11. The green component G of each image point P in the uppermost row of FIG. 6 is then produced in accordance with the stepped curve 28. It will be observed that the voltage of the curve 28 in each of the steps I–IV exceeds the corresponding voltage of the curve 30 by a predetermined amount so that the beam is shifted horizontally through a predetermined distance relative to the red component R of each image point P. In the illustrated embodiment, the magnitude of the voltage difference between the curves 30 and 28 is such that the beam is shifted relative to the red components R by one-third of the distance between neighboring image points P of the same row of FIG. 6, i.e., by one-third of the distance from the red component R of one image point P to the red component R of the adjacent image point P in the same row.

When the green components G of all the image points P have been formed, the blue filter 17c is moved into the path of the image forming beam from the cathode ray tube 11. The blue component B of each image point P in the uppermost row of FIG. 6 is now produced per the stepped curve 29. As before, the voltage of the curve 29 in each of the steps I-IV exceeds the corresponding voltage of the curve 28 by a predetermined amount so that the beam is shifted horizontally through a predetermined distance relative to the green component G of each image point P. Again, the magnitude of the voltage difference between the curves 29 and 28 is here such that the beam is shifted relative to the green components G by one-third of the distance between neighboring image points P of the same row of FIG. 6.

By appropriate control of deflection of the beam, the color components R,G,B of an image point P may be disposed at the apices of an equilateral triangle rather than on a straight line as shown in FIG. 6.

The amount of copy light per image point is equal to beam intensity multiplied by exposure time. In order to obtain distinct image points, the current to the cathode must be adjusted from point to point with intermediate reductions. The exposure time per point may be maintained constant because the differences in image point size, which are achieved by changing the intensity, allow sufficient variation to compensate for differences in exposure time.

Depending upon the sensitivity of the copy material and the emission characteristics of the phosphor, the intensity of the beam in the different primary colors may vary greatly. Accordingly, it may be of advantage for the transmissivities of the various color filters to be different so as to obtain weighted exposures in the individual primary colors.

Regardless of whether the image points are produced by concentric beams of different color as in FIGS. 4a,4b or by forming the individual color components next to one another as in FIG. 6, the color copy material is developed to maximum density.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of copying a transparent color original, said method comprising the steps of:
   (a) measuring the transparencies of discrete points of said color original, the measuring step including measuring the transparencies of said discrete points for blue, green and red primary colors, said transparencies representing the tones of said discrete points; and
   (b) forming an image of said original on copy material having three layers, each of said layers being sensitized to light of a different one of said primary colors, and each of said layers being responsive to light of the respective primary color having an intensity in excess of a corresponding threshold level but being substantially non-responsive to light of the respective primary color having an intensity below the corresponding threshold level, the forming step being performed point-by-point so that each of said discrete points of said original is transformed into an image point of said image, the forming step being performed using a light beam containing light of said primary colors and having an intensity which decreases in a direction from the center to the edge of said beam, the forming step including successively filtering out light of first and second pairs of said primary colors from said light beam so that each of said image points is produced by successively exposing said copy material to light of different ones of primary colors, the forming step being performed by exposing a first part of each of different image points of said copy material to light of one of said primary colors, and exposing at least the first part of each of said image points of said copy material to light of at least one other of said primary colors, the forming step including regulating the intensity of said beam on the basis of said transparencies such that said image points have tones substantially corresponding to the tones of the corresponding discrete points of said original.

2. The method of claim 1, wherein the color composition of the first part of each of said image points of said copy material represents a mixture containing a first predetermined proportion of said one primary color and a second predetermined proportion of said at least one other primary color, the forming step including regulating the intensity of said beam for each of said image points of said copy material in each primary color based on the first predetermined proportion of said one primary color and the second predetermined proportion of said at least one other primary color in the first part of the respective image point.

3. A method of copying a transparent color original, said method comprising the steps of:
   (a) measuring the transparencies of discrete points of said color original, the measuring step including measuring the transparencies of said discrete points for blue, green and red primary colors, said transparencies representing the tones of said discrete points; and
   (b) forming an image of said original on copy material having three layers, each of said layers being sensitized to light of a different one of said primary colors, and each of said layers being responsive to light of the respective primary color having an intensity in excess of a corresponding threshold level but being substantially non-responsive to light of the respective primary color having an intensity below the corresponding threshold level, the forming step being performed point-by-point so that each of said discrete points of said original is transformed into an image point of said image, the forming step being performed using a light beam containing light of said primary colors and having an intensity which decreases in a direction from the center to the edge of said beam, the forming step including successively filtering out light of first and second pairs of said primary colors from said light beam so that each of said image points is produced by successively exposing said copy material to light of different ones of said primary colors, the forming step being performed by exposing a substantially circular first part of each of different image points of said copy material to light of one of said primary colors, and exposing the first part of each of said image points of said copy material, plus a substantially annular second part of each such image point which is essentially concentric with the respective first part, to light of at least one other of said primary colors, the forming step including regulating the intensity of said beam on the basis of said transparencies such that said image points have tones substantially corresponding to the tones of the corresponding discrete points of said original.

4. A method of copying a transparent color original, said method comprising the steps of:
  (a) measuring the transparencies of discrete points of said color original, the measuring step including measuring the transparencies of said discrete points for blue, green and red primary colors, said transparencies representing the tones of said discrete points; and
  (b) forming an image of said original on copy material having three layers, each of said layers being sensitized to light of a different one of said primary colors, and each of said layers being responsive to light of the respective primary color having an intensity in excess of a corresponding threshold level but being substantially non-responsive to light of the respective primary color having an intensity below the corresponding threshold level, the forming step being performed point-by-point so that each of said discrete points of said original is transformed into a corresponding image point of said image, the forming step being performed using a light beam containing light of said primary colors and having an intensity which decreases in a direction from the center to the edge of said beam, the forming step including successively filtering out light of first, second and third pairs of said primary colors from said light beam so that each of said image points is produced by successively exposing said copy material to light of different ones of said primary colors, the forming step being performed by exposing a discrete first part of each of different image points of said copy material to light of one of said primary colors, exposing a discrete second part of each of said image points of said copy material to light of another of said primary colors, and exposing a discrete third part of each of said image points of said copy material to light of an additional one of said primary colors, the forming step being performed in such a manner that the discrete first, second and third parts of each of said image points of said copy material are arranged at the apices of a triangle, and the forming step including regulating the intensity of said beam on the basis of said transparencies such that said image points have tones substantially corresponding to the tones of the corresponding discrete points of said original.

5. The method of claim 4, wherein the forming step is performed in such a manner that the discrete first, second and third parts of each of said image points are arranged at the apices of a substantially equilateral triangle.

6. An apparatus for copying a transparent color original, said apparatus comprising:
  (a) measuring means for measuring the transparencies of discrete points of the color original, said measuring means being designed to measure the transparencies of the discrete points for blue, green and red primary colors, the transparencies representing the tones of said discrete points;
  (b) copy material having three layers, each of which is sensitized to light of a different one of said primary colors and each of which is responsive to light of the respective primary color having an intensity in excess of a corresponding threshold level but which is substantially non-responsive to light of the respective primary color having an intensity below the corresponding threshold level;
  (c) image forming means for forming an image of the original on said copy material, said image forming means including generating means for generating a beam of light containing light of said primary colors and having an intensity which decreases in a direction from the center to the edge of the beam;
  (d) a plurality of filters movable into and out of the path of the light beam and each designed to filter light of a different pair of said primary colors from the beam; and
  (e) control means for controlling said image forming means so as to produce an image of the original point-by-point by transforming each of the discrete points of the original to a corresponding image point of the image, said control means being designed to regulate a cross-sectional area of the beam on the basis of the measured transparencies to thereby adjust the sizes of the respective image points such that the image points have tones substantially corresponding to the tones of the corresponding discrete points of said original, said control means further being designed in such a manner that regulation of the cross-sectional area of the beam is effected exclusively by adjustment of the intensity of the beam, said control means also being designed to control said image forming means in such a manner that the image is produced by exposing a first part of each of different image points of said copy material to light of one of said primary colors, and exposing at least the first part of each such point to light of at least one other of said primary colors, and said control means additionally being designed to regulate the intensity of the beam on the basis of the measured transparencies of the discrete points, the intensity distribution of the beam, the gamma values of the layers of the copy material, and the interaction between said one primary color and said at least one other primary color in the first parts of the image points of said copy material.

7. The apparatus of claim 6, wherein said control means is further designed to control said image forming means in such a manner that the image of the original is produced by exposing a substantially circular first part of each of said different image points of said copy material to said light of said one primary color, and exposing the substantially circular first part of each of said image points of said copy material, plus a substantially annular second part of each such image point which is essentially concentric with the respective substantially circular first part, to said light of said at least one other primary color.

8. The apparatus of claim 6, wherein said control means comprises a filter control unit for selectively moving said filters into and out of the path of the light beam.

9. An apparatus for copying a transparent color original, said apparatus comprising:
  (a) measuring means for measuring the transparencies of discrete points of the color original, said measuring means being designed to measure the transparencies of the discrete points for blue, green and red primary colors, the transparencies representing the tones of the discrete points;
  (b) copy material having three layers, each of which is sensitized to light of a different one of said primary colors and each of which is responsive to light of the respective primary color having an intensity in excess of a corresponding threshold level but which is substantially non-responsive to light of the respective primary color having an intensity below the corresponding threshold level;
  (c) image forming means for forming an image of the original on said copy material, said image forming means including generating means for generating a beam of light containing light of said primary colors and having an intensity which decreases in a direction from the center to the edge of the beam;
  (d) a plurality of filters movable into and out of the path of the light beam and each designed to filter light of a different pair of said primary colors from the light beam; and
  (e) control means for controlling said image forming means so as to produce an image of the original point-by-point by transforming each of the discrete points of the original to a corresponding image point of the image, said control means being designed to regulate a cross-sectional area of the beam on the basis of the measured transparencies to thereby adjust the sizes of the respective image points such that the image points have tones substantially corresponding to the tones of the corresponding discrete points of the original, said control means further being designed in such a manner that regulation of the cross-sectional area of the beam is effected exclusively by adjustment of the intensity of the beam, said control means also being designed to control said image forming means in such a manner that the image is produced by exposing a discrete first part of each of different image points of said copy material to light of one of said primary colors, and exposing a discrete second part of each such image point to light of another of said primary colors, the spacing between the discrete first part and the discrete second part of each image point of said copy material being less than the distance between neighboring image points of said copy material, said control means additionally being designed to shift the beam by said spacing relative to the discrete first part of an image point of said copy material subsequent to exposing the discrete first part of such image point and prior to exposing the discrete second part of such image point, said control means further being designed to regulate the intensity of the beam on the basis of the measured transparencies of the discrete points.

10. The apparatus of claim 9, wherein said image forming means further includes a voltage source for shifting the beam; and wherein said control means is further designed to change the voltage of said source by such an amount subsequent to exposure of the discrete first part of an image point and prior to exposure of the discrete second part of the image point that the beam is shifted relative to the discrete first part of the image point through a distance substantially equal to said spacing.

11. The apparatus of claim 10, wherein said control means is further designed to effect the shifting of the beam by increasing the voltage of said source.

12. The apparatus of claim 9, wherein said control means is further designed to shift the beam so as to expose a discrete third part of each image point to light of an additional one of said primary colors.

13. The apparatus of claim 12, wherein said control means is further designed to effect the shifting of the beam in such a manner that the discrete first, second and third parts of each image point are located at the apices of a triangle.

14. The apparatus of claim 13, wherein said control means is further designed to effect the shifting of the beam in such a manner that the discrete first, second and third parts of each image point are located at the apices of a substantially equilateral triangle.

15. The apparatus of claim 12, wherein said control means is further designed to effect the shifting of the beam in such a manner that the discrete first, second and third parts of each image point are disposed in a line.

16. The apparatus of claim 9, wherein said control means comprises a filter control unit for selectively moving said filters into and out of the path of the light beam.

17. A method of copying a transparent color original, said method comprising the steps of:
  (a) measuring the transparencies of discrete points of said color original for the blue, green and red primary colors, said transparencies representing the tones of said discrete points; and
  (b) forming an image of said original on copy material having three layers, each of which is sensitized to light of a different one of said primary colors, each of said layers being responsive to light of the respective primary color having an intensity in excess of a corresponding threshold level but being substantially non-responsive to light of the respective primary color having an intensity below the corresponding threshold level, the forming step being performed point-by-point so that each of said discrete points of said original is transformed into a corresponding image point of said image, the forming step being performed using a light beam containing light of said primary colors and having an intensity which decreases in a direction from the center to the edge of the beam, and the forming step including regulating a cross-sectional area of said beam on the basis of said transparencies to thereby adjust the sizes of the respective image points such that said image points have tones substantially corresponding to the tones of the corresponding discrete points of said original, said regulating being performed exclusively by adjustment of the intensity of said beam, and the forming step further including successively filtering out light of first and second pairs of said primary colors from said light beam so that each of said image points is produced by successively exposing said copy material to light of different ones of said primary colors.

18. The method of claim 17, wherein the forming step is performed by exposing a discrete first part of each of different image points of said copy material to light of a first one of said primary colors, and exposing a discrete second part of each of said image points to light of a second one of said primary colors.

19. The method of claim 18, wherein the forming step further includes exposing a discrete third part of each of said image points to light of a third one of said primary colors.

20. The method of claim 19, wherein the forming step is performed in such a manner that the discrete first, second and third parts of each image point are located in a line.

21. The method of claim 18, wherein the forming step further includes electronically shifting said beam in order to expose the discrete first and second parts of said image points.

* * * * *